(No Model.)
F. H. LACEY.
GRAIN METER AND REGISTER.
No. 355,828. Patented Jan. 11, 1887.
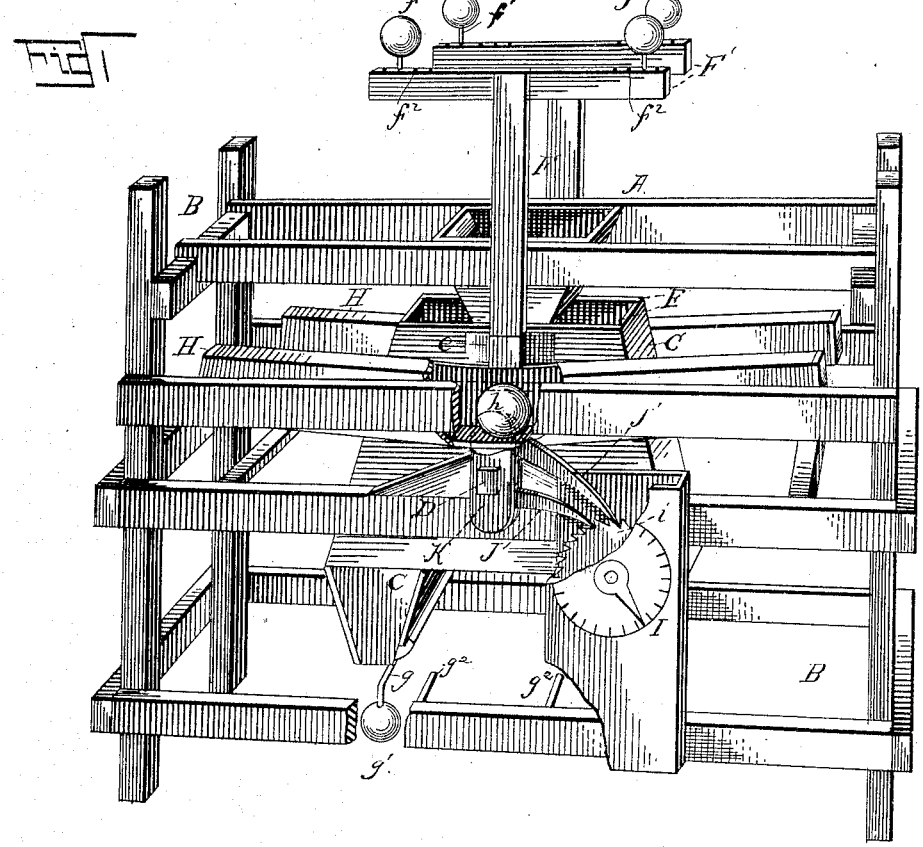
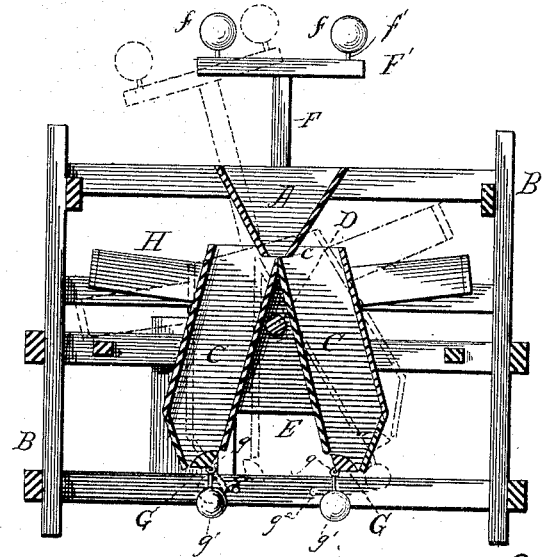
WITNESSES:
Norris A. Clark
R. W. Bishop
INVENTOR:
Francis H. Lacey
By R. S. & A. P. Lacey
Attys

UNITED STATES PATENT OFFICE.

FRANCIS H. LACEY, OF ATCHISON, KANSAS.

GRAIN METER AND REGISTER.

SPECIFICATION forming part of Letters Patent No. 355,828, dated January 11, 1887.

Application filed March 6, 1886. Serial No. 194,238. (No model.)

*To all whom it may concern:*

Be it known that I, FRANCIS H. LACEY, a citizen of the United States, residing at Atchison, in the county of Atchison and State of Kansas, have invented certain new and useful Improvements in Grain-Meters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to grain-meters; and it consists in the novel features more fully hereinafter set forth and claimed, and shown in the following drawings, in which—

Figure 1 is a perspective view of a machine of my construction embodying my invention, parts of the same being broken away to show the internal structure. Fig. 2 is a vertical central longitudinal section.

The hopper A is supported on the frame B. Grain-measures C—two in number—are journaled beneath the hopper by a shaft, D. The grain-measures are reversely inclined, and their adjacent sides meet, forming an approximately knife-edge, $c$. Side boards, E, unite and brace the measures, and are each provided with a keeper, $e$, which is directly in line with the shaft D and the knife-edge $c$. Standards F, having their lower ends slipped in clips or keepers $e$, are removably secured in the keepers, and have cross-arms F', on the outer ends of which weights $f$ are removably and adjustably secured on opposite sides of the standard, each weight being provided with a stem or shank, $f'$, to enter one of a series of openings, $f^2$, in the upper side of the arms, near each end. By this construction the weights may be adjusted nearer to or farther from the plane of the standards, according to the desired quantity to be measured or weighed.

Valves G, closing the lower ends of the measures, are journaled to their lower inner corners, and have that side within the measure formed on the arc of a circle in cross-section, of which the axis about which the valve turns is the center. A rod, $g$, forming the axis, is fastened to the valves, so that both turn together. The outer end is bent downward and provided with a weight, $g'$, which, gravitating, causes the valve to close the opening in the bottom of the measure, as will be readily understood.

The full lines indicate the normal position of the measures which are closed by the valves, and the weights $f$ on the cross-arms of the standards are in the same plane and equidistant from a plane passing vertically through the shaft D. In practice, when it is desired to weigh or measure given amounts of grain, suitable weights, $f$, are mounted on the cross-arms, or they may be adjusted nearer to or farther from the plane of the standards in the manner above noted till the proper adjustment is made. The measures are now tilted, as shown by dotted lines, Fig. 2, the mouth of the one coming directly beneath the hopper, while the mouth of the other is thrown to one side. This movement throws the weight out of equilibrium and to that side of the vertical plane of the center of vibration of the measures, so as to act in opposition to the filling one.

Grain passing into and from the hopper to the measure registering therewith will fill said measure till it counterbalances the weights, when the measures will tilt, bringing the mouth of the empty measure in register with the hopper and carrying the mouth of the filled one to one side. The position of the weights will likewise be reversed in a manner readily comprehended. During the tilting movement, and before the measures come to rest, the weighted arm $g'$ of the filled measure will contact with a stop, $g^2$, located in its path, which, turning the rod $g$, will throw the valve to one side and disclose the opening in the bottom of the measure and permit the discharge of the grain into a suitable receptacle or vessel placed beneath it for the reception.

It will be noticed that the filling-measure is at an inclination to a plane passing vertically through the shaft D, while the emptying-measure is parallel with said plane. Thus the tilting motion is readily accomplished and the supply of grain from one measure to the other quickly cut off.

In addition to the weighted standards F, double inclined ways H may be secured to the sides E of the measures, and hollowed out to receive a shifting weight, $h$, which operates in the usual manner. These inclined ways may be used alone, if desired, or may be used in connection with the weighted standards to receive varying weights to suit different measured quantities of grain, the weights $f$ remaining intact.

The ways are preferably tubular, and the material best adapted for weighting the same is mercury, because of its high specific gravity and celerity of action in passing from an active to a passive state. By having both of the tubes set so as to form a double incline having the central portion depressed, the weight acts quicker when the measures tilt than would be the case if they were straight, and the ends of the ways have a less distance to travel, thereby requiring but a very slight oscillatory movement of the measures to cut off the supply of grain from one measure to the other, and also to shift the counterpoise.

By making the standards F removable the inclined ways may be alone used, and for weighing small quantities it is preferable. Again, when it is desired to shift the position of the weights $f f'$, it is more expedient to remove the standards, the lower ends of which are within convenient reach, adjust the weights, and replace the standards than to procure a step-ladder or kindred object on which to perch in order to reach the weights and then adjust them. In the first instance the weights are adjusted on one side, and then the attendant goes to the opposite side unencumbered and adjusts the weights there. In the latter instance he would be encumbered with and obliged to shift the perch in order to reach the weights.

In order that the number of vibratory movements of the measures may be automatically registered to indicate the number of measured quantities of grain, a tally, I, of any well-known construction, is provided, the ratchet or actuating disk $i$ of which is acted on by pawls J J', pivoted to opposite ends of a short bar or plate, K, keyed to the outer end of shaft D at a point midway the pivotal points of connection of the pawls. The shaft D, oscillating in unison with the measures through the plate K, causes the retraction of one pawl and the simultaneous advancement of the other, which, acting on the ratchet-disk, causes a movement of the registering mechanism of the tally in a manner well understood.

Having thus described my invention, what I claim, and desire to secure by Letters Patent, is—

1. The combination, with the fixed hopper, of the inversely-inclined grain-measures pivotally supported beneath the same, the standards secured thereto in line with the center of vibration of the measures, cross-arms on said standards, and weights on each end of the cross-arm on opposite sides of the plane of the standards, substantially as and for the purpose set forth.

2. The combination of the vibrating measures and the removable weighted standards with the double inclined ways secured to the sides of the measures and adapted to receive shifting weights, substantially as specified.

3. The combination, with the vibrating measures having open bottoms, of rods journaled lengthwise of the openings and having their outer ends bent downward forming arms, of valves secured to said arms and closing the openings in the bottoms, a weight mounted on each arm for keeping the valves normally in position to close the openings in the bottoms, and a stop located in the path of each arm to contact therewith and turn the valves about their axis and disclose said openings, substantially as set forth.

4. The combination, with the vibrating measure having an open bottom, of a valve closing the opening in the bottom journaled midway its edges, and a weighted arm depending from the valve to hold it in position, the valve being above its axis at all times and at any inclination of the measure, substantially as and for the purpose described.

5. The combination, with the vibrating measure having a portion of one corner removed, forming a discharge-opening, of a valve consisting of a segment of a cylinder, and a weighted arm depending from the valve for normally holding it across said opening in the bottom of the measure and above the axial line of the valve, substantially as and for the purpose set forth.

In testimony whereof I affix my signature in presence of two witnesses.

FRANCIS H. LACEY.

Witnesses:
N. B. HENDERSON,
M. K. HOLLEY.